(No Model.)
F. E. BROWN.
SPEEDING CART.
No. 498,154. Patented May 23, 1893.
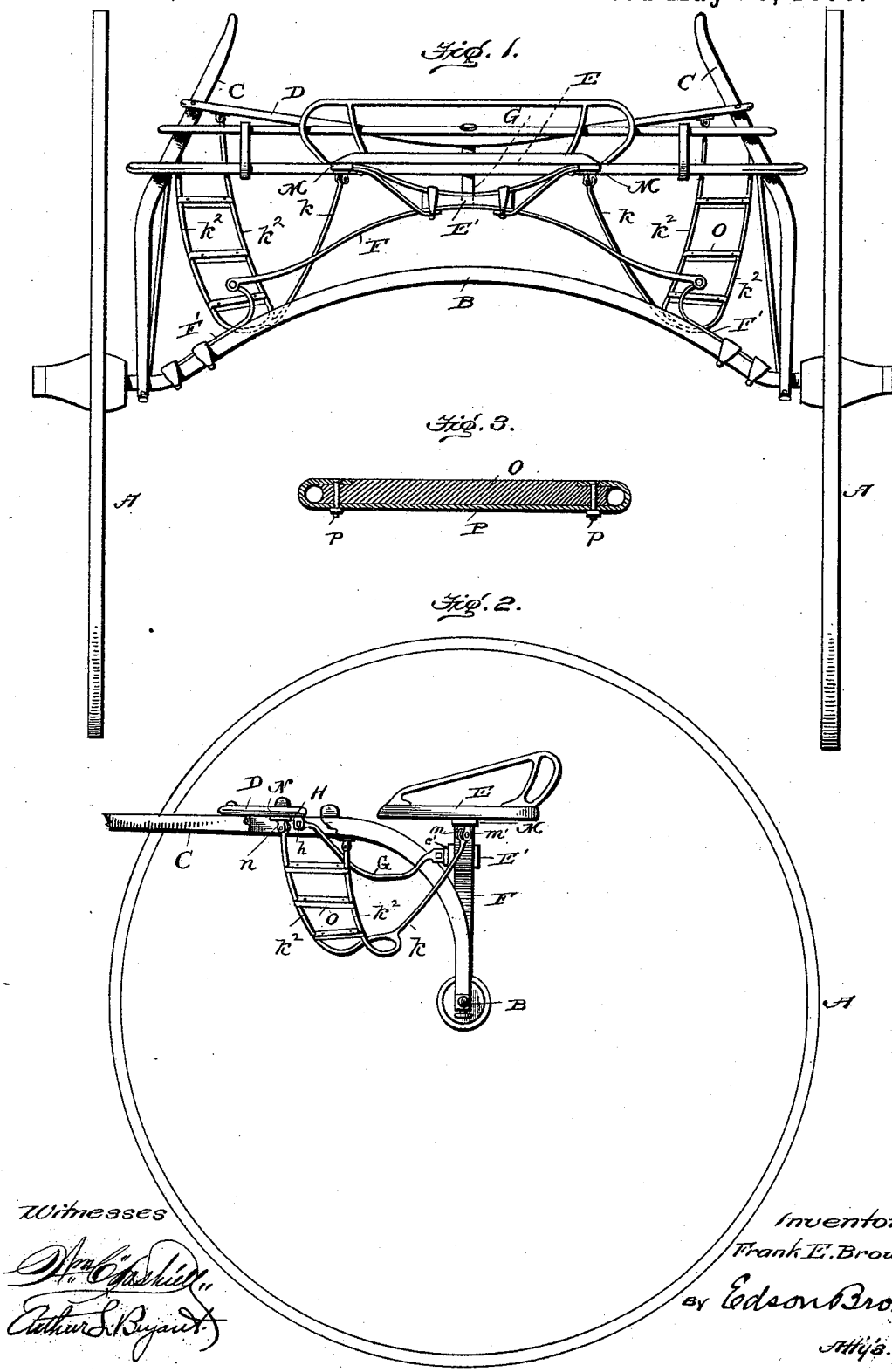

UNITED STATES PATENT OFFICE.

FRANK E. BROWN, OF WEBSTER CITY, IOWA.

SPEEDING-CART.

SPECIFICATION forming part of Letters Patent No. 498,154, dated May 23, 1893.

Application filed December 2, 1892. Serial No. 453,845. (No model.)

*To all whom it may concern:*

Be it known that I, FRANK E. BROWN, a citizen of the United States, residing at Webster City, in the county of Hamilton and State of Iowa, have invented certain new and useful Improvements in Speeding-Carts; and I do hereby declare the following to be a full, clear, and exact description of the invention, such as will enable others skilled in the art to which it appertains to make and use the same.

My invention relates to improvements in speeding or road carts and the main object of the invention is to provide a light and durable cart of the class described in which the seat will be entirely independent of any movement of the shafts and will move simply up and down without any lateral or swinging motion.

A second object of my invention is to provide a strong and simple stirrup or foot rest which is so arranged that the driver does not have to assume a cramped position when resting his feet thereon as is the case in carts constructed in the ordinary manner.

With these ends in view my invention consists in the peculiar construction and arrangement of parts as will be hereinafter fully pointed out and claimed.

In the accompanying drawings—Figure 1 is a rear elevation of my improved cart. Fig. 2 is a side elevation of the same with one of the carrying wheels removed. Fig. 3 is a detail view of one of the transverse bars of one of the stirrups.

Like letters of reference denote corresponding parts in all the figures of the drawings, referring to which—

A designates the wheels of my improved cart, which wheels are carried by an axle B. The axle B is preferably of the "high arch" form, as shown in Fig. 1, so that the horse may be hitched close to the seat, and there will be no danger of his striking the axle when moving rapidly.

C designates the thills or shafts which are preferably of the "single bend" pattern, and said thills or shafts are firmly connected by a circle or curved cross bar D.

The seat E of the cart is provided on its under side with a spring block E' which is firmly attached to a single leaf ribbed spring F the ends of which are connected to short curved springs F' carried by the axle B as shown in Fig. 1. The seat E is further supported by a longitudinally curved supporting arm or brace G which has one end pivotally connected to a lug or ear $e'$ attached to and extending forwardly from the spring block E' and the other end of said brace G is pivotally connected to a depending lug $h$ on a plate H attached to the under side of the circle bar D. The ends of the brace G are, preferably, bifurcated to extend on opposite sides of the lugs $e'$, $h$, and in said bifurcated ends and said lugs are formed aligned apertures through which suitable connecting or pivot bolts are passed. The apertures in the brace G and lugs $e'$, $h$, are preferably made oblong in form so that said brace G will have a limited longitudinal movement.

K designates the stirrups of the cart which consist of a metallic longitudinally curved rod $k$ provided at one end with an eye and connected at its other end to two parallel rods $k^2$ which are provided at their free ends with suitable eyes. The rods $k$ and $k^2$ composing each stirrup may be formed integral or in separate pieces suitably attached together. The upper free end of the rod $k$ extends between parallel depending lugs or ears $m$ carried by a plate M which is attached to the bottom or frame of the seat E and through the eye in said rod and aligned eyes formed in the lugs $m$ is passed a transverse bolt $m'$. The free ends of the bars $k^2$ of the stirrups are attached to lugs $n$ carried by plates N attached to the under side of the thills and circle bar respectively. The lugs $n$ extend at an oblique angle to the plates N to be in line with the rods $k^2$ to which they are attached by bolts extending through the eyes in the ends of said rods and aligned eyes or apertures formed in said lugs.

Between the parallel rods $k^2$ is secured a series of parallel transverse foot bars O. The bars O have concaved ends which fit snugly against the inner sides of the bars $k^2$ and said bars are held in place by spring clips P which extend under said bars, over the rods $k^2$ and have their ends attached to the bars by means of screws or bolts $p$ as shown in Fig. 3.

From the foregoing description in connection with the drawings it will be seen that the seat has no rigid connection whatever with the shafts or circle bar and that all motion arising therefrom will be taken up and the seat move only in a vertical direction instead of laterally and forward and back as is the case in carts of this kind as ordinarily constructed in which there is a rigid connection between the seat and the other parts of the cart.

The stirrups are arranged so far below the shafts as to allow the driver to assume an ordinary sitting position, as in a buggy, instead of the cramped position usually noticed when driving carts of the class referred to.

If desired the relative arrangement and position of the foot bars O can be easily changed.

The rods $k$, $k^2$, composing the stirrups are preferably made of spring steel and they act as a tension in taking the pressure and jerking motion from the back of the horse.

Besides the advantages herein enumerated, a cart constructed in accordance with my invention possesses many others which will be readily apparent to those skilled in the use thereof.

I am aware that changes in the form and proportion of parts and details of construction of devices herein shown and described as an embodiment of my invention can be made without departing from the spirit or sacrificing the advantages thereof, and I therefore reserve the right to make such changes and modifications as fairly fall within the scope of the same.

Having thus fully described my invention, what I claim as new, and desire to secure by Letters Patent, is—

1. In a vehicle of the class described, the combination with a seat, attached to a leaf spring carried by the axle, of a longitudinally extending brace having one end pivotally connected to the seat and its other end pivotally connected to the circle bar of the vehicle, substantially as described.

2. In a vehicle of the class described, the combination with a seat, attached to a leaf spring supported on the vehicle axle, of stirrups each having one end pivotally connected to the seat and their other ends pivotally connected to the frame of the vehicle, substantially as described.

3. In a vehicle of the class described, a foot rest or stirrup having one end pivotally connected to the seat of the vehicle and its other end bifurcated and connected to a shaft and the circle bar of the vehicle, substantially as described.

4. In a vehicle of the character described, a stirrup having one end pivotally connected to the vehicle seat and its forward end bifurcated and pivotally attached to a shaft and the circle bar of the vehicle, and a series of adjustable foot bars carried by the stirrup, substantially as described.

5. In a vehicle of the character described, a stirrup having one end pivotally attached to the vehicle seat and its other end forked or bifurcated and pivotally attached to a shaft and the circle bar of the vehicle, a series of transverse foot bars arranged between the parallel arms of the stirrup, and spring clips adapted to hold said bars in position, substantially as described.

6. In a vehicle of the class described, the combination of a leaf spring carried by the axle and connected at its middle to a spring block, a seat attached to the spring block, a brace having its ends pivotally connected to the spring block and to the circle bar of the vehicle and stirrups pivotally connected to the seat and to the shafts and circle bar, substantially as and for the purpose described.

In testimony whereof I affix my signature in presence of two witnesses.

FRANK E. BROWN.

Witnesses:
  GEO. WAMBACH,
  R. F. BAINBRIDGE.